United States Patent [19]
Koga et al.

[11] Patent Number: 5,140,483
[45] Date of Patent: Aug. 18, 1992

[54] DRUM UNIT WITH CURVED CONTROL SIGNAL HEAD SURFACE

[75] Inventors: Hirohisa Koga; Kenji Kobayashi, both of Kanagawa, Japan

[73] Assignee: Sony Corporation, Japan

[21] Appl. No.: 675,160

[22] Filed: Mar. 26, 1991

[30] Foreign Application Priority Data

Mar. 31, 1990 [JP] Japan ................................ 2-085710

[51] Int. Cl.⁵ .......................... G11B 5/187; G11B 5/52
[52] U.S. Cl. ........................................ 360/107; 360/122
[58] Field of Search ............................ 360/107–108, 360/122

[56] References Cited

U.S. PATENT DOCUMENTS

| | | | |
|---|---|---|---|
| 4,706,146 | 11/1987 | Dohmen et al. | 360/122 |
| 4,853,814 | 8/1989 | McClure | 360/122 X |
| 4,910,629 | 3/1990 | Mitsuhashi et al. | 360/122 X |

FOREIGN PATENT DOCUMENTS

63-46615 2/1988 Japan ................................ 360/107

Primary Examiner—John H. Wolfffe
Attorney, Agent, or Firm—Ronald P. Kananen

[57] ABSTRACT

The head surface of the control signal head is formed into the curved surface such that the head surface of the control signal head has a first radius of curvature in the circumferential surface of the drum in the direction corresponding to the magnetic tape sliding direction, the first radius of curvature being slightly smaller than the radius of the drum, and such that the head surface of the control signal head has the second radius of curvature at least on the side of the rotary head in the direction perpendicular to this direction, the second radius of curvature being larger than the first radius of curvature. A drum unit is capable of bringing the rotary head and the control signal head into contact with the magnetic tape in an excellent manner with the control signal head embedded. With such a construction, a drum unit which is capable of fairly enhancing the utility of a rotary head type recording/reproducing system is provided.

1 Claim, 5 Drawing Sheets

DRUM UNIT WITH CURVED CONTROL SIGNAL HEAD SURFACE

BACKGROUND OF THE INVENTION

This invention relates to a drum unit, and more particularly may e applied to that used for a video tape recorder, for example.

In conventional video tape recorders (VTRs), there is used a tracking technique in which by the use of control signals (hereinafter referred to as CTL pulses) recorded in control (CTL) tracks in a magnetic tape, tracking of helical recording tracks which correspond to the CTL pulses are performed.

As shown in FIG. 1, in a magnetic tape 1 of a VTR, a helical recording track $TR_O$ is obliquely formed by a helical scan of the rotary head, and a CTL track $TR_{CTL}$ is formed at the lower edge of the magnetic tape 1.

In view of spaces for traveling and loading of the magnetic tape 1, the CTL head for recording CTL pulses in and reproducing them from such CTL track $TR_{CTL}$ is practically arranged at a remote position outside the drum unit.

A desired matching in phase to the helical recording track $TR_O$ is carried out in a signal processing system, and it is thereby possible to record a CTL pulse which corresponds to the helical recording track $TR_O$.

There is a VTR in which an improvement is achieved in recording density as a whole by reducing helical recording tracks $TR_O$ on the magnetic tape 1 in track width and by thinning the magnetic tape 1.

In such a case, the magnetic tape 1 makes an extension or a contraction due to a change in environment and a change according to lapse of time. This causes an error to occur in tracking of helical recording tracks $TR_1$ which correspond to CTL pulses due to deformation of the recording pattern.

The length of the helical recording tracks $TR_O$ is determined according to the diameter and the wrapping angle of the drum unit. For example, in the component digital VTR according to the SMPTE D-1 format, the length is selected to 170 mm.

When the magnetic tape recorded in such a manner changes in recording pattern due to a change according to lapse of time or the like, as shown in FIG. 2, tracking may be made so as to provide a maximum reproduction level at the central portion of each of the helical recording tracks $TR_O$ for reproduction to minimize degradation of reproduced signals $S_{RF}$.

Even if the magnetic tape 1 extends or contracts, it is accordingly possible to efficiently obtain reproduced signals $S_{RF}$ by recording CTL pulses, which correspond to the helical recording tracks $TR_O$, at central portions of the helical recording tracks $TR_O$.

For this purpose, there is a VTR in which a conventional drum unit is provided with a CTL head for recording CTL pulses on and reproducing them from CTL tracks $TR_{CTL}$, and thereby CTL pulses are recorded in and reproduced from positions corresponding to central portions of the helical recording tracks $TR_O$.

More specifically, in such a VTR, a magnetic tape 1 is as shown in FIG. 3 wrapped around a drum unit 4 at a predetermined wrapping angle by inclining guides 2 and 3, and helical recording tracks $TR_O$ on the magnetic tape 1 are recorded and reproduced by a rotary head 6 disposed in a gap 5 between an upper drum 4A and a lower drum 4B.

Here, the magnetic tape 1 is guided by an upper edge guide 4C, formed in the upper drum 4A, and a lower edge guide 4D which is a step formed in the lower drum 4B. Thereby the magnetic tape 1 is capable of sliding on the circumferential surface of the drum unit 4.

Furthermore, the drum unit 4 is provided at a central portion of the lower edge guide 4D with a circular hold 4E into which a control head 7 is fitted and embedded. The control head 7 is formed in a cylindrical shape by joining mask members to a core member having a coil and wiring members attached to it and having a recording and reproducing gap 7A. CTL pulses are recorded at and reproduced from positions which correspond to central portions of the helical recording tracks $TR_O$.

Since the CTL head 7 is formed in the cylindrical shape, a magnetic powder or the like which is produced by contacting a sliding surface of the magnetic tape 1 is previously prevented from being deposited. The fitting of the CTL head 7 into the circular hole 4E of the drum unit 4 makes it detachable, and hence improves maintenance.

Between the magnetic tape sliding surface of the drum unit 4 and the magnetic surface of the magnetic tape 1, there is formed an air film layer, which enables smooth traveling of the magnetic tape 1 by the so-called fluid, lubrication function.

This air film layer air film layer is also generated between the CTL head 7 and the magnetic tape 1, where recording and reproducing errors are liable to occur due to the so-called spacing loss in a case where in recording or reproduction, the CTL head 7 is not brought into contact with the magnetic tape 1.

For this reason, in a VTR using the drum unit 4, an air film is, as shown in FIG. 4A, made thin by making the tape tension as high as possible. At the same time, a magnetic tape contact surface (hereinafter referred to as a head surface) of the CTL head 7 in which contact surface a recording and reproducing gap 7A is formed is designed in the shape of a curved surface having a radius of curvature in the magnetic sliding direction, the radius of curvature $R_H$ being slightly smaller than a drum radius $R_D$. This construction enhances the urging force of the magnetic tape 1 against the head surface of the CTL head 7, and thereby the production of the spacing loss is effectively avoided.

However, when in the drum unit 4 with such a construction, the tape tension in the magnetic tape 1 is enlarged as described, the urging force of the rotary head 6 against the magnetic tape 1 becomes larger. This causes the rotary head 6 to be liable to easily wear, and increases sliding noises of the magnetic tape 1, so that S/N ratio deteriorates.

Moreover, there is a problem in that a load is applied to the loading guides of the magnetic tape 1 themselves according to the tape tension, resulting in that the magnetic tape 1 is not smoothly guided to thereby provide a damage to the magnetic tape 1. This also results in that the life of the guides of the loading mechanism becomes short by the wearing thereof.

In addition to these, there is a problem in that unerased parts are liable to be produced in a case where erosure and writing of CTL pulses are performed only by the recording and reproducing gap 7A. In an extreme case, illegal formatting may take place, thereby making reproduction impossible.

This problem can be overcome by arranging a CTL head for erosure only in addition to the CTL head 7 as recording and reproducing head, but such a solution makes the construction and the fabrication step of the head rather complicated. As shown in FIG. 4B, use is thus made of a CTL head 8 with the so-called double gap construction in which an erosure gap 8B is provided in addition to the recording and reproducing gap 8A.

In the case as this where the recording and reproducing gap 8A and the erosure gap 8B are formed in the CTL head 8, it is necessary to wrap the magnetic tape 1 over the two gaps 8A and 8B with spacing kept as small as possible.

However, merely equating the radius of curvature $R_H$ of the CTL head 8 in the magnetic tape sliding direction with that of the CTL head 7 of FIG. 4A makes it difficult to secure a sufficient wrap of the magnetic tape 1 and produces unnecessary spacing.

For this reason, it is considered to slightly project the CTL head 8 from the magnetic tape sliding surface of the drum unit 4 but this raises a problem in that the rotary head 6 cannot sufficiently contact the magnetic tape 1.

As specifically shown in FIG. 5, in a case where the rotary head 6 projects 20 micrometers, for instance, from the magnetic tape sliding surface of the drum unit 4, the CTL head 8 also is projected 20 micrometers. The air gap 9A of the magnetic tape 1 between the rotary head 6 and the CTL head 8 becomes markedly thicker than an air film layer 9B.

As a result, a tent T0 is not sufficiently formed around the rotary head 6, so that a spacing loss is produced. As shown in FIG. 6, this results in that the level of a reproduced envelope waveform ENV0 obtained from the rotary head 6 drops at a reproduction position $P_{CTL}$ which corresponds to the CTL head 8. The recording and reproduction operation is hence not correctly carried out, and this solution is still not sufficient.

Moreover, the projection of the CTL head 8 by 20 micrometers from the magnetic tape sliding surface of the drum unit 4 produces a problem such that the magnetic tape 1 is raised upwardly, so that helical recording tracks $TR_O$ are deteriorated in linearity.

SUMMARY OF THE INVENTION

In view of the foregoing, an object of this invention is to provide a drum unit which solves all the conventional problems and is capable of making a rotary head and a control signal head into contact with a magnetic tape in an excellent manner.

The foregoing object and other objects of the invention have been achieved by the provision of a drum unit 4 in which a rotary head 6 for helically scanning a magnetic tape 1 and a control signal head 10 are provided, the magnetic tape wrapped around at a predetermined wrapping angle or a contact angle and the control signal head 10 being arranged at a predetermined position on a lower edge side of a sliding surface of the magnetic tape 1 on a circumferential surface of the drum, characterized in that a head surface 13 of the control signal head 10 is formed into a curved surface such that the head surface 13 of the control signal head has a first radius $RH_0$ of curvature in a circumferential surface of the drum in a first direction corresponding to the magnetic tape sliding direction, the first radius $R_{HO}$ of curvature being slightly smaller than a radius $R_D$ of the drum, and such that the head surface of the control signal head has a second radius $R_{H1}$ of curvature at least on the side of the rotary head 6 in a second direction perpendicular to the first direction, the second radius $R_{H1}$ of curvature being larger than the first radius $RH_0$ of curvature, the head surface 13 of the control signal head being adapted to contact the magnetic tape 1.

The head surface 13 of the control signal head 10 is formed into a curved surface such that the head surface 13 of the control signal head has a first radius $R_{HO}$ of curvature on a circumferential surface of the drum in a direction corresponding to the magnetic tape sliding direction, the first radius $R_{HO}$ of curvature being slightly smaller than a radius $R_D$ of the drum, and such that the head surface of the control signal head has a second radius $R_{H1}$ of curvature at least on the side of the rotary head 6 in a direction perpendicular to this direction, the second radius $R_{H1}$ of curvature being larger than the first radius $R_{HO}$ of curvature. The rotary head 6 and the control signal head 10 are thus capable of contacting the magnetic tape 1 in an excellent manner.

The nature, principle and utility of the invention will become more apparent from the following detailed description when read in conjunction with the accompanying drawings in which like parts are designated by like reference numerals or characters.

DETAILED DESCRIPTION OF THE INVENTION

Figure 1:
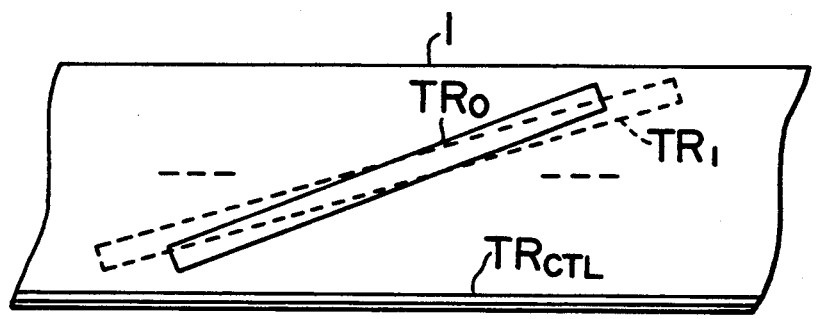
FIG. 1 is a diagrammatic view showing the format of the magnetic tape.
Figure 2:
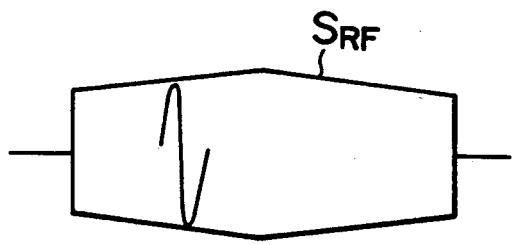
FIG. 2 is a waveform chart showing the waveform of the reproduced signal.
Figure 3:
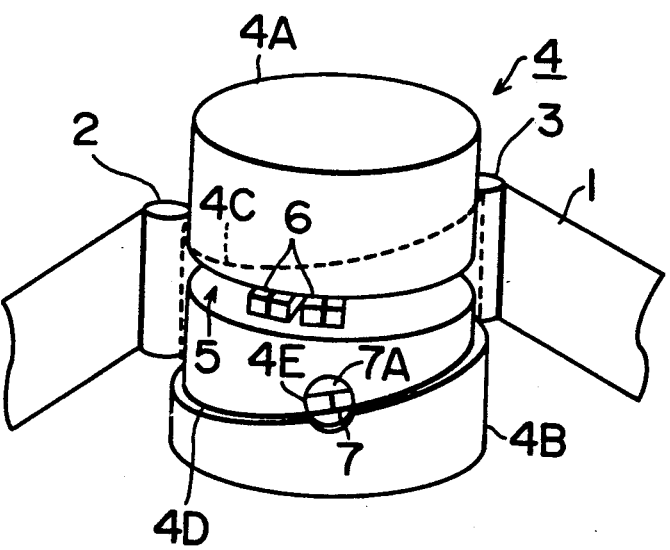
FIG. 3 is a diagrammatic perspective view illustrating the drum unit.
Figure 4A:
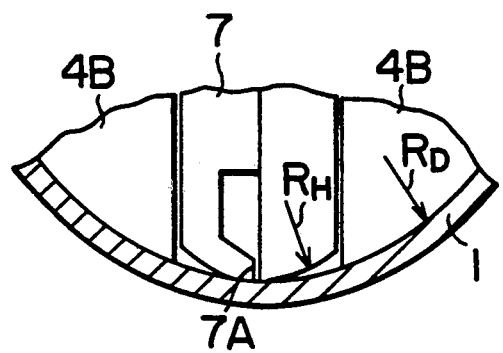
FIGS. 4A and 4B are diagrammatic cross-sectional views illustrating arrangements of the CTL heads in the conventional drum unit.
Figure 4B:
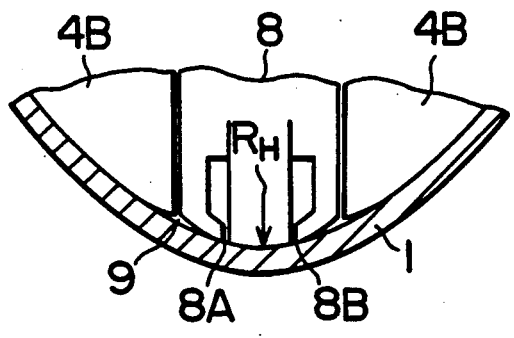
Figure 5:
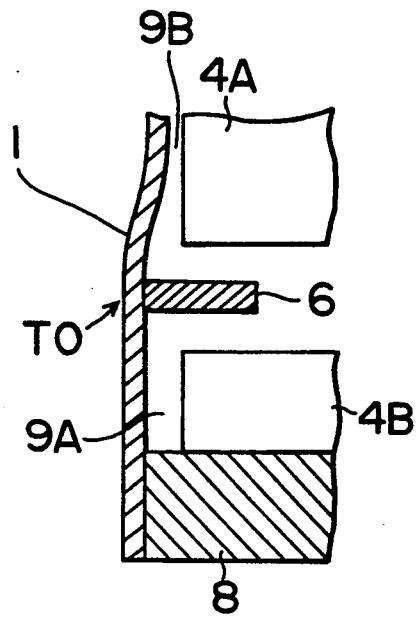
FIG. 5 is a diagrammatic vertical-sectional view illustrating the operation of the conventional drum unit.
Figure 6:
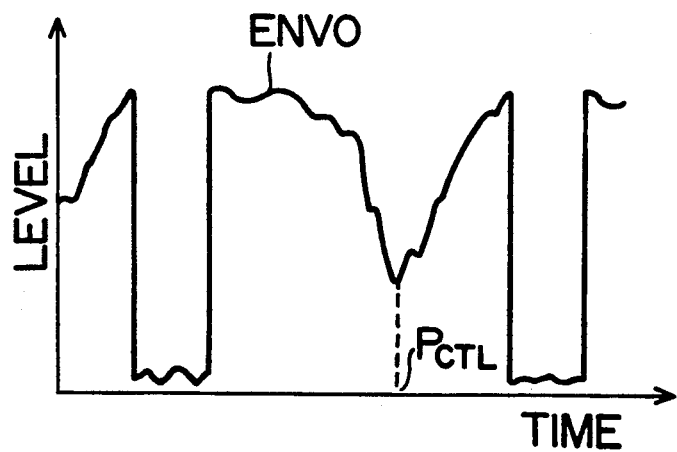
FIG. 6 is a signal waveform chart showing the reproduced envelope waveform obtained from the rotary head of the conventional drum unit.
Figure 7:
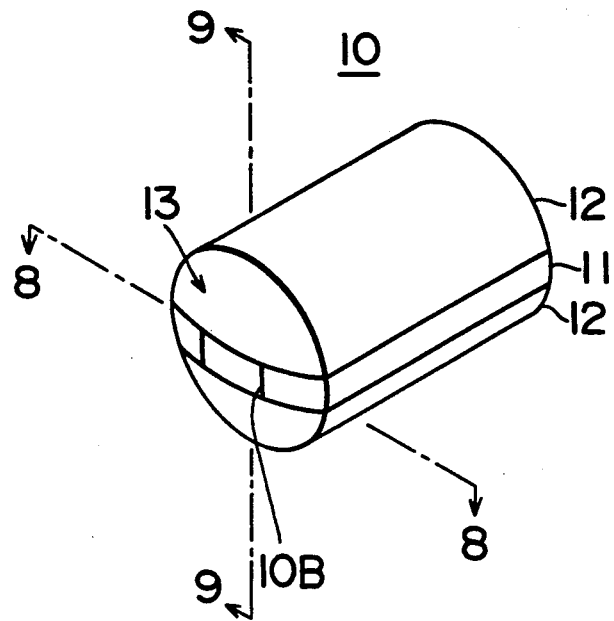
FIG. 7 is a diagrammatic perspective view illustrating the CTL head embedded in the drum unit according to the present invention.
Figure 8:
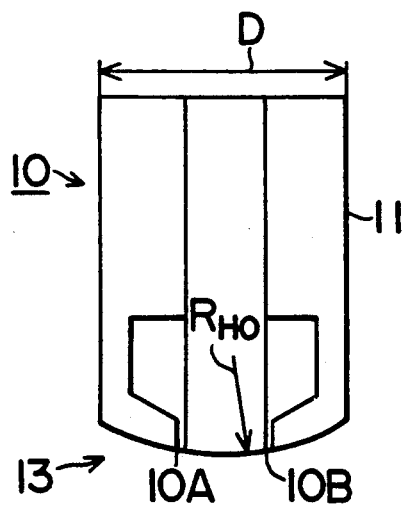
FIGS. 8 and 9 are diagrammatic sectional views of the CTL head taken along the lines 8—8 and 9—9.

Preferred embodiments of this invention will be described with reference to the accompanying drawings:

In FIG. 7 the reference numeral 10 generally designates a CTL head, which is formed by joining mask members 12 to a core member 11 to which a coil and wiring members are attached. The CTL head 10 has a cylindrical shape having a diameter D (say, D=7 mm) which corresponds to a circular hole 4E formed in a central portion of a lower edge guide 4D of a drum unit 4 (FIG. 3).

The core member 11 of this CTL head 10 has a double gap structure in which an erasing gap 10A and a recording and reproducing gap 10B are provided, and the head surface 13 which comes into contact with a magnetic tape 1 is polished in a predetermined curved surface.

Figure 9:
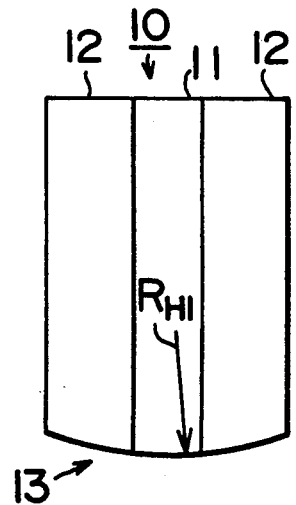

In this embodiment, the head surface 13 is, as shown in FIG. 9, designed to have a first radius of curvature $R_{HO}$ (say, $R_{HO}=35$ mm) in a circumferential direction on the drum unit 4, which is the magnetic tape sliding direction, according to a drum radius $R_D$ (say, $R_D=37.5$ mm), the first radius of curvature $R_{HO}$ being slightly smaller than the drum radius $R_D$.

Furthermore, in this embodiment, the head surface 13, as shown in FIG. 9, has a second radius of curvature $R_{H1}$ in a direction perpendicular to the circumferential direction of the drum unit 4 which is the magnetic tape sliding direction, the second radius of curvature $R_{H1}$ being larger than the first radius of curvature $R_{HO}$.

When the second radius of curvature $R_{H1}$ is designed so that the central portion of the head surface 13 projects by 20 micrometers from the magnetic tape sliding surface of the drum unit 4, it is further set that the amount of projection of the outermost circumferential portion of the head surface 13 from the magnetic tape sliding surface is below zero (say, $R_{HO}=300$ mm) by solving the following simultaneous equation:

$$R_{H1}(1-\cos\theta)=20 \text{ (micrometers)} \quad ...(1)$$
$$R_{H1}.\sin\theta=3.5 \text{ (mm)} ... \quad (2)$$

With such a configuration, the CTL head 10 which has the head surface 13 polished in the predetermined curved shape is fitted to the circular hole 4E of the drum unit 4 in such a fashion that the central portion of the head surface 13 projects 20 (micrometers) from the magnetic tape sliding surface.

Figure 10:
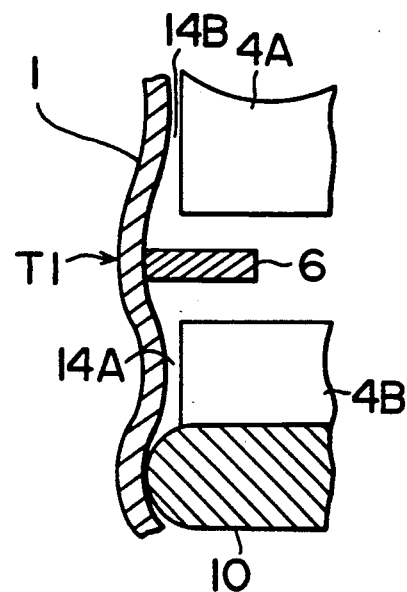
FIG. 10 is a diagrammatic vertical sectional view illustrating the operation of the drum unit of the embodiment.

In a state where the magnetic tape 1 slides as shown in FIG. 10, with such a construction the magnetic tape 1 is bent along the head surface 13 of the CTL head 10 since the CTL head 10 has a curved surface shape with the second radius of curvature $R_{H1}$, and hence a gap 14A between the magnetic tape sliding surface and the magnetic tape 1 between the rotary head 6 and the CTL head 10 becomes substantially equal in thickness to an air film layer 14B.

Figure 11:
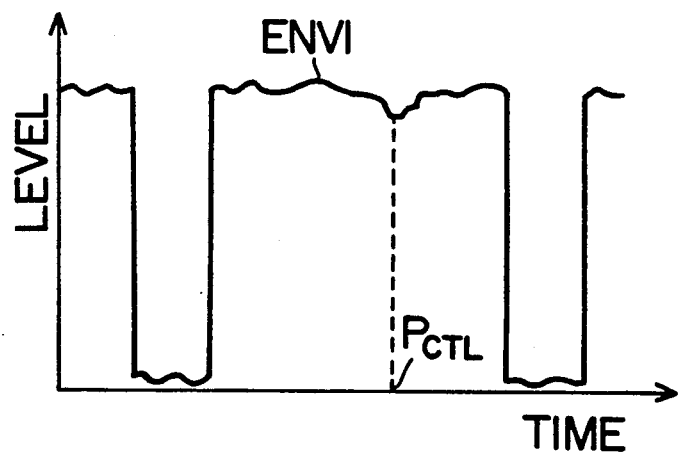
FIG. 11 is a waveform chart of a signal showing the reproduced envelope waveform obtained from the rotary head of the drum unit of the embodiment.

As a result, an ideal tent T1 of the magnetic tape 1 is formed around the rotary head 6 to thereby sufficiently suppress a spacing loss. As shown in FIG. 11, the level of a reproduced envelope waveform ENV1 attained from the rotary head 6 thus only slightly drops even at a reproduction position $P_{CTL}$ corresponding to the CTL head 10, and hence practically sufficient reproduced signals are obtained.

According to the construction above, the head surface 13 of the CTL head 10 is formed into the curved surface such that it has a first radius of curvature $R_{HO}$ in a direction in a circumferential surface of the drum corresponding to the magnetic tape sliding direction, the first radius of curvature $R_{HO}$ being slightly smaller than a drum radius $R_D$, and such that the head surface 13 further has a second radius of curvature $R_{H1}$ in a direction perpendicular to this direction, the second radius of curvature $R_{H1}$ being larger than the first radius of curvature $R_{HO}$. This realizes a drum unit which is capable of bringing the rotary head 6 and the CTL head 10 into contact with the magnetic tape 1 with the embedded CTL head 10 in an excellent manner.

In the preceding embodiment, it is described that the head surface 13 of the CTL head 10 is formed into the curved surface such that it has the first radius of curvature $R_{HO}$ in a direction corresponding to the magnetic tape sliding direction, and such that the head surface 13 further has the second radius of curvature $R_{H1}$ in the direction perpendicular to this direction. However, an effect similar to the embodiment above may also be achieved in such a manner that the second radius of curvature $R_{H1}$ is provided only to the side of the rotary head in the direction perpendicular to the direction corresponding to the magnetic tape sliding direction.

Although in the preceding embodiment, it is stated that the present invention is applied to the video tape recorder, the present invention is not limited to this. The present invention may be widely applied to drum units such as a digital audio tape recorder using a rotary head.

While the invention has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A drum unit in which a rotary head and a control signal head are provided, the rotary head helically scanning a magnetic tape wrapped around the drum unit at a predetermined wrapping angle or a contact angle, and the control signal head being arranged at a predetermined position or the drum unit corresponding to on a lower edge side of a sliding surface of the magnetic tape on a circumferential surface of the drum, characterized in that a head surface of the control signal head is formed into a curved surface such that the head surface of the control signal head has a first radius of curvature on a circumferential surface of the drum in a first direction corresponding to the magnetic tape sliding direction, the first radius of curvature being slightly smaller than a radius of the drum, and such that the head surface of the control signal head has a second radius of curvature on the side of the rotary head in a second direction perpendicular to the first direction, the second radius of curvature being larger than the first radius of curvature, the head surface of the control signal head being adapted to contact the magnetic tape.

* * * * *